United States Patent
Beyer et al.

(10) Patent No.: US 6,744,005 B1
(45) Date of Patent: Jun. 1, 2004

(54) METHOD FOR PRODUCING SHAPED BODIES OR APPLYING COATINGS

(75) Inventors: Eckhard Beyer, Weissig (DE); Steffen Nowotny, Radebeul (DE); Siegfried Scharek, Freital (DE)

(73) Assignee: Fraunhofer-Gesellschaft zur Forderung der Angewandten Forschung e.V., Munich (DE)

( * ) Notice: Subject to any disclaimer, the term of this patent is extended or adjusted under 35 U.S.C. 154(b) by 45 days.

(21) Appl. No.: 10/110,423

(22) PCT Filed: Sep. 22, 2000

(86) PCT No.: PCT/DE00/03370
§ 371 (c)(1),
(2), (4) Date: May 9, 2002

(87) PCT Pub. No.: WO01/26851
PCT Pub. Date: Apr. 19, 2001

(30) Foreign Application Priority Data

Oct. 11, 1999 (DE) .......................................... 199 49 972

(51) Int. Cl.$^7$ .............................................. B23K 10/00
(52) U.S. Cl. ........................... 219/121.41; 219/121.46; 219/121.64; 219/121.58; 219/76.16; 427/455
(58) Field of Search ....................... 219/121.47, 121.59, 219/121.43, 121.52, 76.15, 76.16, 121.63, 121.64; 427/446, 455, 456, 367; 118/723 R, 723 I

(56) References Cited

U.S. PATENT DOCUMENTS 4,487,157 A * 12/1984 Bergeron et al. ............. 118/59
4,957,062 A * 9/1990 Schuurmans et al. ........ 118/723
5,306,447 A   4/1994 Marcus et al.
5,466,907 A * 11/1995 Vuitton .................. 219/121.59
5,837,960 A * 11/1998 Lewis et al. ........... 219/121.63
6,379,754 B1 * 4/2002 Schlegel et al. ............ 427/446

FOREIGN PATENT DOCUMENTS

DE        22 63 777 A       7/1973
DE        195 33 960 A      3/1997

* cited by examiner

Primary Examiner—Mark Paschall
(74) Attorney, Agent, or Firm—Leydig, Voit & Mayer, Ltd.

(57) ABSTRACT

The invention relates to a method for producing shaped bodies or applying coatings on workpieces. The aim of the invention is to produce shaped bodies which are structured in an almost arbitrarily three-dimensional manner or contoured coatings are allowed to be formed on most different workpieces wherein simultaneously the required time and energy will be reduced in comparison with conventional procedures. According to the invention, a shaped body will be built-up in layers or a coating that consists of at least two individual layers will be applied on a workpiece. For this, a platform whereon the shaped body will be built-up or the workpiece is held in a clamping device which is movable within at least two axes in relation to two different sources of heat. The layers which are located inside the shaped body or which are arranged towards the surface of the workpiece will be formed by means of plasma arc weld surfacing or using an inductor having a greater layer thickness and track gauge of the individual layers, and at least one external cover layer having a smaller layer thickness and track gauge will be formed by means of laser beam weld surfacing.

16 Claims, 1 Drawing Sheet

METHOD FOR PRODUCING SHAPED BODIES OR APPLYING COATINGS

Figure 1:
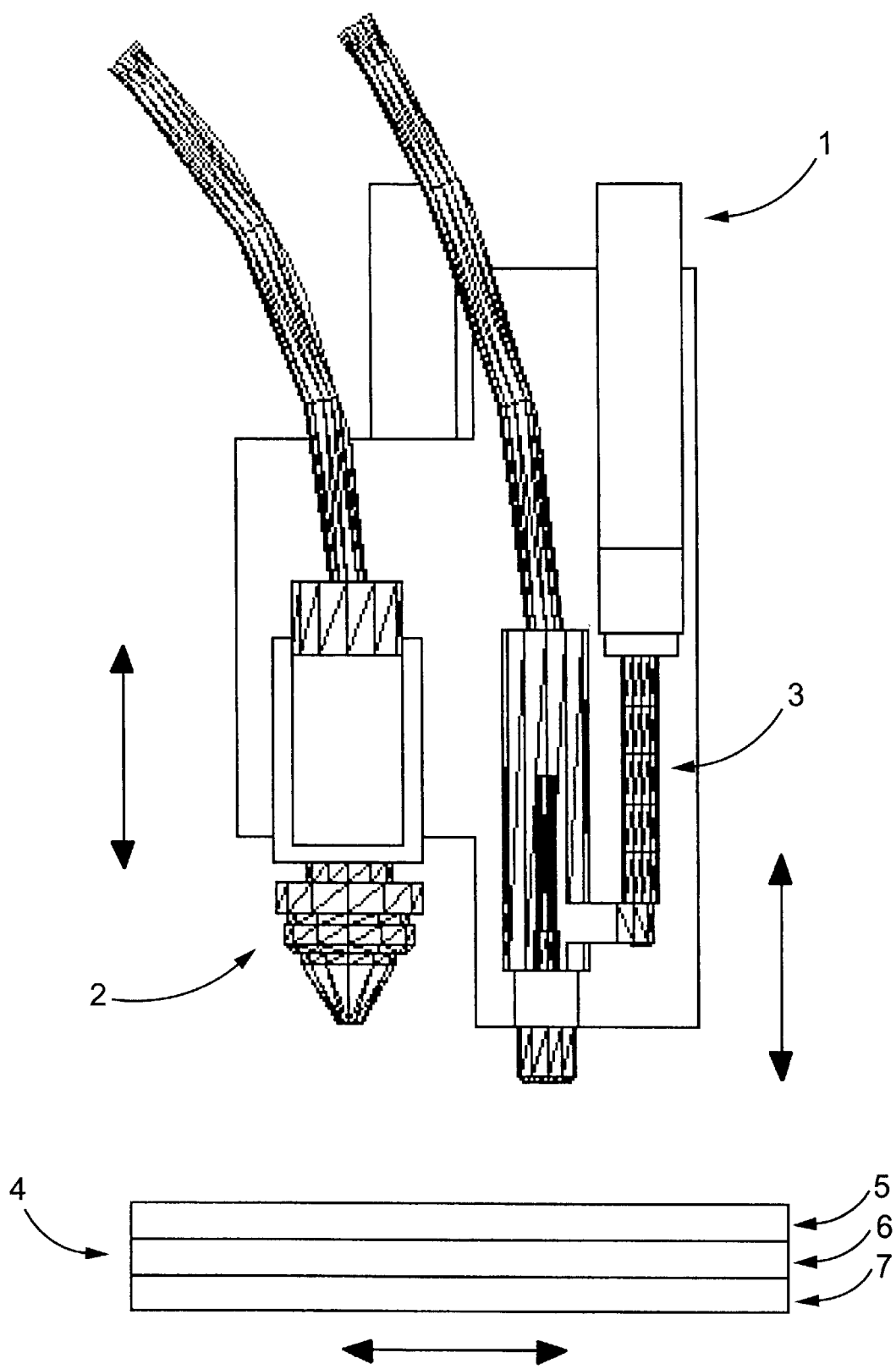

This application is the U.S. National Phase of international patent application PCT/DE00/03370, filed on Sep. 22, 2000, and claiming priority to German patent application number 199 49 972.1, filed Oct. 11, 1999, hereby incorporated by reference.

The invention relates to a method for producing shaped bodies or for applying coatings on workpieces wherein it is to be dealt starting from well-known solutions which are known according to the term Rapid Prototyping, and herein in particular the laser beam precision type deposition welding. Thus, the invention can be used for the production of various three-dimensional shaped bodies with most different contoured surfaces, for example, and with cavities as well wherein undercuts can also be readily achieved. In addition, a relatively good finishing accuracy in the range of a few tenths of a millimeter can be ensured which requires slight finishing works only.

Another field of application for the invention is the formation of coatings on workpieces which are allowed to have particular contoured surfaces as well being up to surfaces realized in relatively filigreed manner. Thus, by the deposition of respective coatings, e.g. it is also possible to return worn-out or damaged surface areas of workpieces into the original state comprising the initial dimensions. Thus, both the wear related ablation and damages occurred due to overloads which have taken place are allowed to be balanced again.

In the recent past, different ways for the production of workpieces, for example, are known from DE 195 33 960 A1 among others in which the laser beam precision type deposition welding is employed. Then, such a three-dimensional workpiece is produced such that subsequently a three-dimensional formed body will be successively built up with a plurality of individual layers in a multilayered manner, which is differently dimensioned and formed inside the various layers. With this, a laser beam is respectively guided and formed such that supplied metal powder can be placed as single tracks, and can be molten on by means of a laser beam, and a layer having a plurality of parallel juxtaposed tracks can be formed within one plane, wherein a relatively good finishing accuracy can be achieved by obtaining very small widths and thicknesses of the track which will be increased by machining.

However, it is deleteriously with this well-known solution that the time consumed for producing such a workpiece is still relatively high in particular due to the relatively small achievable layer thicknesses in combination with the small track gauges. Another disadvantage is in that, on the one hand the efficiency is relatively small because of the laser beam used in combination with the absorption behaviour of the metal powder used. The last mentioned disadvantage will be further increased if during the formation of coatings on workpieces these are required to be preheated or reheating has to be implemented to maintain a particular temperature, since with this the laser beam used has to be defocussed, and thereby neither a second laser beam serving thereto has to be used nor an intermittent procedure including heating phases with the laser beam defocussed, and layer forming phases with the focussed laser beam are required which in turn involves an increase of the necessary time consumed.

Therefore, it is an object of the invention to propose a way wherein shaped bodies which are structured in an almost arbitrarily three-dimensional manner can be produced or contoured coatings on most different workpieces can be formed as well wherein simultaneously the required time and energy are reducible with respect to the conventional procedures.

In FIG. 1, a preferred embodiment of the device 1 for producing shaped bodies or applying coatings on workpieces according to the invention is shown comprising a laser beam 2 and a plasma torch 3 (replaceable by an inductor) over a workpiece 4 on which coatings 5, 6, and 7, have been applied.

According to the invention, it will then be proceeded that a platform on which a three-dimensional shaped body is to be constructed or a workpiece which is to be provided with a respective coating is clamped into a clamping device. This clamping device and/or two different heat sources are movable relative to each other within at least two axes, wherein a respective motion of the clamping device certainly can also be achieved in more than two, preferably up to five different degrees of freedom in a more simple and convenient manner.

Then, a shaped body can be successively built up on this platform with a plurality of individual layers wherein an almost arbitrary three-dimensional shape can be achieved. Conveniently, on this platform at least one base will be built up at first which the final shaped body can be produced upon then. With this, a method having a relatively great deposition rate is suitable which is represented by the plasma surfacing, for example, or the use of an inductor which is connected to a respective induction generator.

Subsequently thereto, the shaped body will be built up on this one or a plurality of such bases wherein the external layers or marginal areas are produced by means of laser beam deposition welding wherein smaller layer thicknesses and track gauges can be achieved with respect to the other methods already mentioned such that a greater finishing accuracy and contour accuracy is achievable in the final surface area of such a shaped body.

Then, the internal layers are allowed to be formed again with the two different methods mentioned at the beginning by means of which layer thicknesses and track gauges can be achieved which are greater than being the case with laser deposition welding such that the required production time can be considerably reduced, and moreover the required energy can be decreased, and in addition the required energy is reducible by means of the respective higher efficiency.

Similarly, it will also be dealt with the formation of a coating at least on portions of the surface of workpieces wherein on that occasion, as a rule, the internal ones being therefore in close proximity on the surface of the workpiece to be coated can be formed with the greater deposition rate by means of plasma deposition welding or using an inductor, and the final cover layer then forming the surface of the coating will subsequently be formed by means of laser beam deposition welding. With the latter method, filigreed surface structures can also be produced which are allowed to project relatively wide beyond the remaining coated surface as well.

All the layers comprising the various mentioned methods are almost arbitrarily often allowed to be formed one upon another independently whether a shaped body is to be produced or a coating is to be formed.

Thus, it is not necessary in each case to coat and form all external surface areas of shaped bodies and coatings, respectively, by means of laser beam deposition welding. It may be sufficient to form merely critical areas of such a coating and a shaped body, respectively in such a manner.

Supplied metal or ceramic powders, however composites of these agents as well are allowed to be employed as layer materials. On that occasion, with the method of plasma deposition welding such a powder supply can occur with a carrier gas.

Plasma torches with single or double electrode assemblies can be used wherein having a single electrode plasma torch the backing electrode can be formed by a respective electric terminal, the workpiece to be coated, as the case may be, or by the platform and the shaped bodies, respectively, wherein a plasma is generated between them by means of the burning arc which the supplied layer material can be melted to. According to this procedure, a metal filler wire can be used instead of a powder layer material to form the respective layers which is continuously tracked into the arc area and the plasma, respectively, and is allowed there to be molten on in a respective manner.

It is also possible for the layer forming material to be molten on with only one plasma torch and one arc, respectively, and to be directed upon a layer already formed or upon the surface to be coated, wherein the relatively high power (appr. 80 kW) will be employed with higher efficiency, and the final layer formation is provided by means of a laser beam which power can be correspondingly smaller. For this, the laser beam which is used for the laser beam deposition welding can be employed.

If the layers are generated using an inductor by inductive heating it is conveniently for the used powder to be conveyed into the correspondingly heated area without any pressure wherein heating on the surface has to occur in this respect such that the melting temperature of the layer material used will be achieved. On that occasion, with powder mixtures such as alloys which are able to include hard materials as the case may be, the melting temperature has not to be generally achieved for all included components, however it is sufficient if an important part will be molten on.

Favourably, with laser beam deposition welding, however powder should be used.

Moreover, the invention can be completed as to that during and/or after the production of a shaped body or the formation of a coating, machining is performed which can also be limited to particular areas. With this, it is also conveniently for the shaped body or the respective workpiece to be clamped in the same clamping device, and to provide therewith a respective alignment of the surfaces to be finished toward a machining tool (grinding disc, miller or others). It is particularly advantageous to use an automated tool change system in order to have alternatives for the most different machining jobs under the consideration of the surfaces to be finished and finishing accuracies.

With the method according to the invention it also opens up a possibility to insert and mount, respectively, additional elements into a shaped body which during its production can be placed in particular locations which subsequently are no longer accessible, and which are allowed then to be surrounded by means of the method according to the invention. For example, such elements can be shafts, sensors or others as well.

By using two different heat sources the possibility of pre-heating and/or reheating particular areas of shaped bodies or coatings also opens up in a relatively simple and effective manner in order to largely prevent internal stresses inside the produced shaped body and a coating, respectively, or even on the workpiece, and to selectively effect for particular applications (compressive strains). Pre-heating and/or reheating can be implemented with the plasma torch or the inductor. In particular, with pre-heating and reheating by means of an inductor it is conveniently to use a respective annular and loop shaped inductor, and to direct the laser beam through the ring and the loop, respectively, to form the layers with the laser beam deposition welding.

However, with the invention it is readily possible to produce composite shaped bodies and coatings, respectively. On that occasion, different layer materials can be applied for different areas. Thus, the internal portion of a shaped body or the area of a coating located in close proximity on the surface of a workpiece can be generated with another material which is advantageously more cost-effective than may be the case for the external layer areas which as a rule will be preferably formed then as a closed layer and deposited, respectively, by means of laser beam deposition welding. Thus, for example a wear protective coating on workpieces can be produced in a cost-effective and efficient manner.

In particular, with the formation of coatings on workpiece surfaces being worn-out and damaged, respectively, it is advantageous to determine the available actual contour prior to the formation of the coating wherein a digitizing system can be used with this such as a tactile element and an optical detector, respectively, which is preferably connected to an electronic image processing for surface returning such that the actual contour is available in a three-dimensional manner and preferably in a digitized form, and is allowed to be fed into an electronic control. Then, in this electronic control a variance comparison with a nominal contour of the surface of a workpiece stored as well is allowed to occur, and on the basis of which the layered deposition of the various layers with the two different coating methods can be selectively controlled.

The producing process and coating operation, respectively, can also be controlled with a distance sensor, however, with an optical detector as well.

In particular, the latter effects in a favourable manner when fissures have arisen with the methods comprising a greater deposition rate which can be closed after a respective recognition by means of laser beam deposition welding before external layers and tracks having a smaller thickness and width, respectively, will be formed again with this method.

Of course, the electronic control already mentioned can also be utilized for manipulating the clamping device, machining and as the case may be, for inserting the additional elements into a respective prepared shaped buoy wherein a respective manipulator for inserting the additional elements such as a relatively simple industrial robot can be controlled by means of the electronic control.

In particular cases it can be required also to adapt the distance of the used different heat sources toward the position of the respective layers to be formed, wherein a motion has to be carried out at least along one axis. With this, on the one hand, the clamping device can accordingly be moved, however, there is the possibility as well to shift the heat sources within one axis respectively. This also applies for laser beam deposition welding since a respective beam shaping by means of suitable focussing cannot be sufficient in each case in order to ensure the small layer thicknesses and track gauges in the different planes.

Ambitious objects of the surface protection of structural members or workpieces, a repair, however, a relatively simple, low-cost and rapid manufacture of prototypes or the production of small series can be carried out with the invention. Almost arbitrarily, three-dimensional structures can be made due to the multilayer contour controlled material deposition which also achieve improved properties in related areas and on the surface respectively or as a whole by means of correspondingly used layer materials.

By combining the formation of the layers with machining that can be carried out both during the production process and the coating operation, respectively, but also following thereto, additional expenditures with respect to the transportation, programming, alignment and clamping in further machines are eliminated when machining operations will be carried out within the same voltage. Moreover, the design of members can be enlarged by a possible assembly of additional elements in between since restrictions with respect to the design of the structural members which have been present and required joining processes until now can be eliminated.

The necessary data including in particular the dimensions of shaped bodies structural members or workpieces are merely required for electronic control since this is allowed to control simultaneously the complete manufacturing and assembling process.

Thus, it deals with a complex shaping and manufacturing method which becomes possible by section related processing during the manufacturing and coating processes on partial surfaces as well, wherein it is also allowed for areas to be machined which cannot be reached on a finished shaped body.

Therefore, the shaped body or the workpiece to be coated are allowed to be removed from the clamping device with a high finishing accuracy and being completely processed such that any additional after treatments are not required.

On the receivers, guiding devices or supports small tolerances can be created which have to be met for example in combination with the different mechanical members such as shafts, levers or valves but for electric or optical function elements (coils, sensors) as well. From the mentioned reasons compact and complex formed shaped bodies or workpieces are allowed to be manufactured or processed wherein the achievable precision can be met not only within the macro range, in the micro range as well, thus also in relatively small parts within the millimeter range. With the small parts preferably a micro plasma torch will be employed, however, which achieves a deposition rate being greater than being possible with laser beam deposition welding.

Subsequently, the invention is to be explained by way of example.

On a worn-out forging die for the manufacture of automotive vehicle chassis members the original shape of the die should be reconstituted wherein it deals with a die sinking formed in a complex manner on the die. On that occasion, in particular with such a forging die the wear occurred is not generally constant over the surface areas. Thus, it can be necessary to variably implement a deposition in different locations on the die in the range of between 10 and 20 mm, and on that occasion of course to achieve again the high requirements with respect to the behaviour to wear and proximity of nominal contour with such a forging die.

With this, the surface profile of the worn-out die sinking has been recorded by means of a digitizing system, and the material volume to be locally reconstituted on the worn-out surface of the forging die has been determined in a three-dimensional manner with the aid of such data. Subsequently with this, then the coating regime will be defined wherein it will be determined which areas are to be reconstituted and at which overall thickness by means of the plasma arc weld surfacing, wherein starting from a well-known layer thickness and track gauges the respective number of layers being formed one upon another can be determined in a locally resolved manner, and then the formation thereof will be carried out.

In different areas of such a forging die milling processing can be performed. With the plasma arc weld surfacing about 90% of the material to be substituted should be deposited wherein the coating thus obtained can be made from a well weldable low-cost steel in the form of a weld filling layer. This part of the coating is allowed to occur with the electronic control as a multitrack weld surfacing wherein a deposition rate between 5 and 12 kg/h can be achieved without any problems.

After a required intermediate milling processing as the case may be, then by means of laser beam weld surfacing a cover layer can be formed as a function layer consisting of a cobalt hard alloy Stellit 21 which conveniently will be formed as a closed cover layer. With this, for example a 500 W solid state laser can be used.

Deposition rates between 0.1 and 0.5 kg/h can be achieved with the laser beam deposition welding. The error in dimension with respect to the desired contour to be reconstituted of the forging die is equal to approximately +0.2 mm and can be brought to the proper desired nominal contour by means of the subsequent milling processing.

For all manufacturing steps of the most different methods the same CAD data can be utilized during the entire process sequence.

What is claimed is:

1. A method for producing shaped bodies or applying coatings on workpieces wherein a shaped body will be built-up in layers or a coating consisting of at least two individual layers will be applied on a workpiece, wherein a platform on which said shaped body will be built-up or the workpiece are held in a clamping device being movable in at least two axes with respect to two different heat sources, and the layers located inside the shaped body or arranged towards the surface of the workpiece will be formed with a greater layer thickness and track gauge of the individual layers by means of plasma arc weld surfacing or using an inductor, and at least one external cover layer will be formed with a smaller layer thickness and track gauge by means of laser beam weld surfacing.

2. A method according to claim 1, wherein metal powder, ceramic powder or a metallic filler wire are used as layer material.

3. A method according to claim 1, wherein at least one machining operation will be performed in related areas during or after producing the shaped body and/or the formation of the coating wherein said shaped body or said workpiece is held in said same clamping device.

4. A method according to claim 1, wherein additional elements will be inserted and subsequently surrounded during producing said shaped body.

5. A method according to claim 1, wherein pre-heating and/or reheating will be performed with a plasma torch or an inductor.

6. A method according to claim 1, wherein different materials will be used for the internal and external layers.

7. A method according to claim 1, wherein prior to forming the coating the actual contour of said workpiece surfaces to be coated will be determined, and the digitized data will be fed to an electronic control in order to make a particular nominal contour on the surface of said workpiece by depositing in layers.

8. A method according to claim 1, wherein fissures in the formed layers will be detected and closed by means of laser beam deposition welding.

9. A method according to claim 1, wherein layer material will be guided through an arc burning between two electrodes of a plasma torch; and which there will be molten on and directed in the molten condition upon a surface of a workpiece or a layer already formed, and said layer(s) will be formed by means of a laser beam.

10. A device for implementing a method according to claim 1, wherein a platform or a workpiece is held by means of a clamping device which is movable at least in two axes with respect to a plasma torch or an inductor and a laser beam guiding and forming unit as heat sources, and in that layer material feeders are present on the two different heat sources used wherein said fed layer material can be molten on by means of the respective heat source, and the heat sources and the layer material feedings can be connected to an electronic control.

11. A device according to claim 10, wherein a tactile element and/or an optical detector is (are) available for the detection of the surface structure of said shaped body or said workpiece which is connected to said electronic control for controlling the process.

12. A device according to claim 10, wherein said heat sources and said layer material feedings for the formation of layers are displaceable along an axis to change the distance.

13. A device according to claim 10, wherein a heat source is a micro plasma torch.

14. A device according to claim 10, wherein said inductor is formed in an annular or loop manner, and said laser beam is directed through the ring or the loop of said inductor.

15. A device according to claim 10, wherein at least one device for machining operation of said shaped body or said coating is available.

16. A device according to claim 10, wherein an automated tool change system is connected to said device for machining operation.

* * * * *